United States Patent
Ollila et al.

(10) Patent No.: US 12,207,004 B2
(45) Date of Patent: Jan. 21, 2025

(54) UTILISING DIFFERENT APERTURES FOR DIFFERENT EYES

(71) Applicant: Varjo Technologies Oy, Helsinki (FI)

(72) Inventors: Mikko Ollila, Tampere (FI); Kai Inha, Järvenpää (FI)

(73) Assignee: Varjo Technologies Oy, Helsinki (FI)

( * ) Notice: Subject to any disclaimer, the term of this patent is extended or adjusted under 35 U.S.C. 154(b) by 166 days.

(21) Appl. No.: 18/067,362

(22) Filed: Dec. 16, 2022

(65) Prior Publication Data
US 2024/0205553 A1    Jun. 20, 2024

(51) Int. Cl.
| H04N 23/959 | (2023.01) |
| H04N 7/18 | (2006.01) |
| H04N 23/13 | (2023.01) |
| H04N 23/56 | (2023.01) |
| H04N 23/67 | (2023.01) |
| H04N 23/63 | (2023.01) |

(52) U.S. Cl.
CPC .......... *H04N 23/959* (2023.01); *H04N 7/183* (2013.01); *H04N 23/13* (2023.01); *H04N 23/56* (2023.01); *H04N 23/675* (2023.01); *H04N 23/63* (2023.01)

(58) Field of Classification Search
None
See application file for complete search history.

(56) References Cited

U.S. PATENT DOCUMENTS

| 10,382,712 | B1* | 8/2019 | Forutanpour | H04N 23/80 |
| 2004/0183965 | A1* | 9/2004 | Lundgren | G02B 27/58 |
| | | | | 349/113 |
| 2016/0198082 | A1* | 7/2016 | Choi | H04N 5/272 |
| | | | | 348/333.02 |
| 2018/0243045 | A1* | 8/2018 | Franjic | H04N 23/80 |
| 2018/0325620 | A1* | 11/2018 | Mak | H04N 7/183 |
| 2020/0167962 | A1* | 5/2020 | Chang | H04N 23/75 |
| 2021/0232216 | A1* | 7/2021 | Hudman | G01J 1/0429 |
| 2022/0046326 | A1* | 2/2022 | Sugano | H04N 21/21805 |
| 2024/0046477 | A1* | 2/2024 | Feng | H04N 5/2226 |

* cited by examiner

*Primary Examiner* — Twyler L Haskins
*Assistant Examiner* — Wesley J Chiu
(74) *Attorney, Agent, or Firm* — Ziegler IP Law Group LLC

(57) ABSTRACT

An imaging apparatus includes: a left camera and right camera; and processor(s) configured to: control the left and right cameras to capture pairs of left and right images, respectively, wherein a left image of one of two consecutive pairs and a right image of another of two consecutive pairs are captured using one of small aperture size(s) and large aperture size(s), whilst a right image of one of two consecutive pairs and a left image of another of two consecutive pairs are captured using any one of: (i) another of small aperture size(s) and large aperture size(s), (ii) one of small aperture size(s) and medium aperture size(s) and another of small aperture size(s) and medium aperture size(s), respectively, (iii) one of large aperture size(s) and medium aperture size(s) and another of large aperture size(s) and medium aperture size(s), respectively; and send the captured images to client device(s) or server(s).

19 Claims, 4 Drawing Sheets

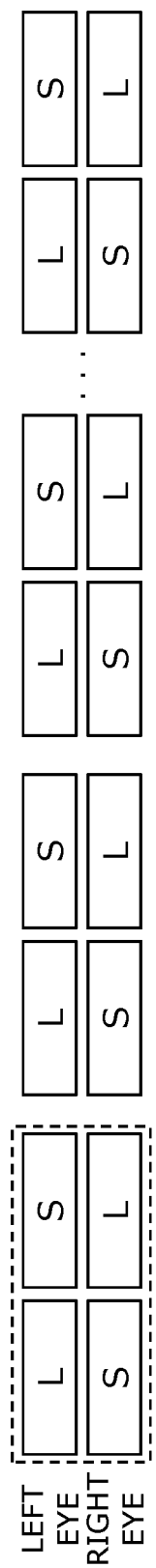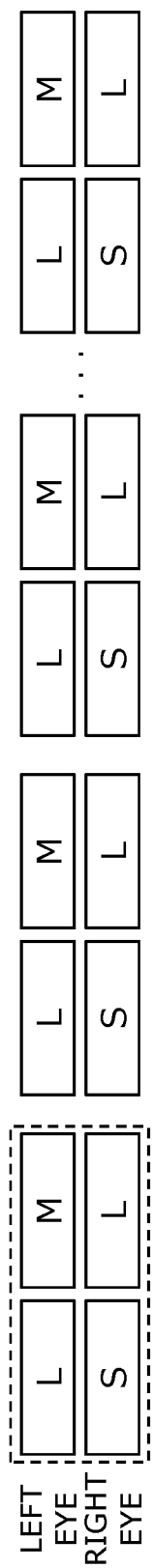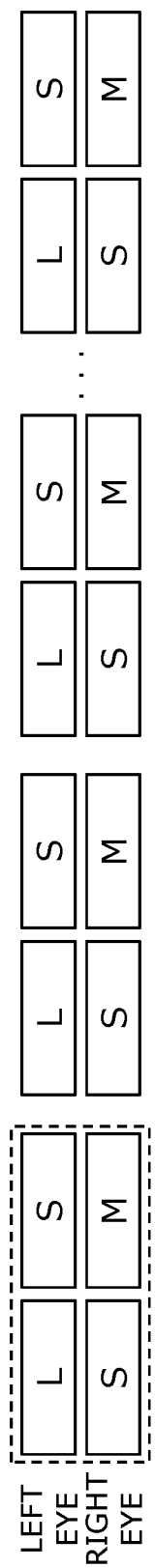

UTILISING DIFFERENT APERTURES FOR DIFFERENT EYES

TECHNICAL FIELD

The present disclosure relates to imaging apparatuses for capturing images by utilising different apertures for different eyes. The present disclosure also relates to client devices for displaying images captured by utilising different apertures for different eyes. The present disclosure further relates to methods for capturing images by utilising different apertures for different eyes.

BACKGROUND

In the recent decade, three-dimensional (3D) telepresence is actively being explored by researchers to bring the world closer. Such a 3D telepresence involves using evolving technologies such as immersive extended-reality (XR) technologies which makes an individual feel as if they are present at a location different from an existing location of the individual. With recent advancements in such technologies, demand for generating high-quality and realistic images that can be accessed by multiple users using multiple devices has been increasing.

Simultaneous generation of such images for multiple devices is quite complex, and is associated with several limitations. Firstly, for remote telepresence, cameras that are used for image capturing typically suffer from depth-of-field issues. Such depth-of-field issues are prominent in fixed-focus cameras due to lack of adjustable optical focus. Images of a real-world environment are sharply captured by a given fixed-focus camera only for a specific focal plane, and are captured blurred outside the specific focal plane. Furthermore, even when an autofocus camera is employed for capturing the images, it is still not possible to capture sharp (i.e., in-focus) images in an entire field of view, because the autofocus camera can be adjusted according to only one focusing distance range at a time. Moreover, there is also a limitation of the autofocus camera in providing a greater resolution because its focal length cannot be increased as that would result in a limited depth of field. As an example, even when a distance between a focal plane and the autofocus camera changes from 50 centimeters (cm) to 100 cm, the focal length would change from 2 millimeters (mm) to 3 mm, and an image resolution would just marginally improve, for example, from 35 pixel-per-degree (PPD) to 55 PPD. Thus, there would be a trade-off between a depth-of-field of the autofocus camera and the image resolution. Therefore, the generated images are of low quality and unrealistic. Secondly, existing techniques for generating images using a stereo pair of cameras are suitable for a single user only, because they can be employed to focus (namely, foveate) depending on the gaze of the single user at a given time. Thus, multiple users gazing at different optical depths cannot be served by such existing techniques.

Therefore, in light of the foregoing discussion, there exists a need to overcome the aforementioned drawbacks associated with existing equipment and techniques for image generation for multiple devices.

SUMMARY

The present disclosure seeks to provide an imaging apparatus for capturing images by utilising different apertures for different eyes. The present disclosure also seeks to provide a client device for displaying images captured by utilising different apertures for different eyes. The present disclosure further seeks to provide a method for capturing images by utilising different apertures for different eyes. An aim of the present disclosure is to provide a solution that overcomes at least partially the problems encountered in prior art.

In a first aspect, an embodiment of the present disclosure provides an imaging apparatus comprising:
- a left camera and a right camera, each of the left camera and the right camera having an adjustable aperture; and
- at least one processor communicably coupled to at least one client device or to at least one server serving the at least one client device, wherein the at least one processor is configured to:
  - control the left camera and the right camera to capture a sequence of pairs of left images and right images of a scene of a real-world environment, respectively, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
    - (i) another of the at least one small aperture size and the at least one large aperture size,
    - (ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
    - (iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and
  - send the sequence of the pairs of the left images and the right images to the at least one client device or to the at least one server.

In a second aspect, an embodiment of the present disclosure provides a client device comprising at least one light source per eye, and a processor configured to:
- receive a sequence of pairs of left images and right images of a scene of a real-world environment captured by a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
  - (i) another of the at least one small aperture size and the at least one large aperture size,
  - (ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size, (iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and display the sequence of the pairs of the left images and the right images using the at least one light source per eye.

In a third aspect, an embodiment of the present disclosure provides a method comprising:

capturing a sequence of pairs of left images and right images of a scene of a real-world environment by using a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:

(i) another of the at least one small aperture size and the at least one large aperture size, (ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size, (iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and sending the sequence of the pairs of the left images and the right images to at least one client device or to at least one server serving the at least one client device.

Embodiments of the present disclosure substantially eliminate or at least partially address the aforementioned problems in the prior art, and enable capturing of high-quality, highly immersive and realistic images using a single pair of cameras, by way of using different apertures for different eyes, and thereby allowing for one or more users to view such images simultaneously.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 2A, 2B, and 2C illustrate different exemplary ways in which consecutive pairs of left images and right images can be captured, in accordance with an embodiment of the present disclosure;

Figure 1A:
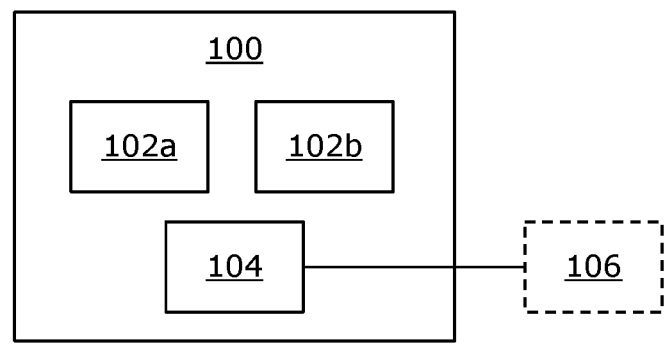
FIGS. 1A and 1B illustrate block diagrams of architectures of an imaging apparatus for capturing images by utilising different apertures for different eyes, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging apparatus comprising:

a left camera and a right camera, each of the left camera and the right camera having an adjustable aperture; and at least one processor communicably coupled to at least one client device or to at least one server serving the at least one client device, wherein the at least one processor is configured to:

control the left camera and the right camera to capture a sequence of pairs of left images and right images of a scene of a real-world environment, respectively, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
(i) another of the at least one small aperture size and the at least one large aperture size,
(ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
(iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and
send the sequence of the pairs of the left images and the right images to the at least one client device or to the at least one server.

In a second aspect, an embodiment of the present disclosure provides a client device comprising at least one light source per eye, and a processor configured to:
receive a sequence of pairs of left images and right images of a scene of a real-world environment captured by a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
(i) another of the at least one small aperture size and the at least one large aperture size,
(ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
(iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and
display the sequence of the pairs of the left images and the right images using the at least one light source per eye.

In a third aspect, an embodiment of the present disclosure provides a method comprising:
capturing a sequence of pairs of left images and right images of a scene of a real-world environment by using a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
(i) another of the at least one small aperture size and the at least one large aperture size,
(ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
(iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and
sending the sequence of the pairs of the left images and the right images to at least one client device or to at least one server serving the at least one client device.

The present disclosure provides the aforementioned system and the aforementioned method that enable generation of high-quality, highly immersive and realistic images using a single pair of cameras, by way of using different apertures for different eyes, and thereby allowing for one or more users to view such images simultaneously. The present disclosure also provides the aforementioned client device for displaying the aforesaid images to a user of the client device. For a given user, in each cycle of the sequence of the two consecutive pairs of left images and right images, the left images and the right images are captured by using different aperture sizes (i.e., using small aperture sizes, large aperture sizes, and optionally, medium aperture sizes) of the respective cameras. As a result, a high visual quality is achieved by a combined view of a given pair of a left image and a right image with reduced computational requirements. This is because using the large aperture size would provide better image quality (such as in terms of a high brightness, a high contrast, a high MTF resolution, a low noise, and the like in low-light conditions) though for a limited depth-of-field, while using the small aperture size would provide an improved depth-of-field across a wide range of focusing distance ranges. Notably, human binocular vision fuses the left image and the right image into one, such that human brain picks up a better contrasted image of a same region of the real-world environment from amongst the left image and the right image. Thus, the user would experience acceptably high realism and immersiveness when said sequence is shown to the user, because of human binocular vision. Adjustable apertures also work well with very wide-angle cameras. The system and the method are simple, robust, fast, reliable, support real-time high-quality image generation and can be implemented with ease.

The images are sent to the at least one client device or to the at least one server. It will be appreciated that the imaging apparatus may be present in a real-world environment that is different from a real-world environment in which the at least one client device (or a user of the at least one client device) and/or the at least one server (serving the at least one client device) is/are present. Notably, the at least one processor controls an overall operation of the imaging apparatus.

It is to be understood that when the imaging apparatus is communicably coupled to the at least one server serving the at least one client device, the at least one server acts as an intermediary between the imaging apparatus and the at least one client device. In some implementations, the at least one server is implemented as a remote server. In such implementations, the remote server is separately located from the imaging apparatus and the at least one client device. In an example, the remote server could be a cloud server that provides a cloud computing service. In other implementations, the at least one server is implemented as a processor of a computing device. Examples of the computing device include, but are not limited to, a laptop, a desktop, a tablet, a phablet, a personal digital assistant, a workstation, and a console.

The sequence of the pairs of the left images and the right images (received from the imaging apparatus or from the at least one server) is to be presented to the user of the at least one client device. Optionally, the at least one client device is implemented as a display apparatus. The "display apparatus" refers to a specialized equipment that is configured to present an extended-reality (XR) environment to the user when the display apparatus, in operation, is worn by the user on his/her head. In such an instance, the display apparatus acts as a specialized device (for example, such as an XR headset, a pair of XR glasses, and the like) that is operable to present a visual scene of the XR environment to the user. Commonly, the "display apparatus" is referred to as "head-mounted display (HMD) device". The term "extended-reality" encompasses virtual reality (VR), augmented reality (AR), mixed reality (MR), and the like.

It will be appreciated that the left camera and the right camera of the imaging apparatus are employed to capture images of the real-world environment from a perspective of a left eye and a right eye, respectively. Optionally, in this regard, the left camera and the right camera are arranged to face said real-world environment in a manner that a distance between them is equal to an interpupillary distance (IPD) between the left eye and the right eye. In an example, the distance between the left camera and the right camera may be equal to an average IPD.

Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Alternatively, optionally, the given camera is implemented as a combination of a visible-light camera and a depth camera. Examples of the depth camera include, but are not limited to, a Red-Green-Blue-Depth (RGB-D) camera, a ranging camera, a Light Detection and Ranging (LIDAR) camera, a Time-of-Flight (ToF) camera, a Sound Navigation and Ranging (SONAR) camera, a laser rangefinder, a stereo camera, a plenoptic camera, an infrared (IR) camera. As an example, the given camera may be implemented as the stereo camera. The given camera may have a sensor chip having some phase detection autofocus (PDAF) pixels. The term "given camera" encompasses the left camera and the right camera.

Notably, the given camera has an adjustable aperture. This means that a size of an opening through which light travels into the given camera (specifically, onto an image sensor of the given camera) is adjustable. Such an adjustment facilitates in capturing sharp images of objects present at different optical depths in the real-world environment in which the given camera is present. It is to be understood that the given camera having the adjustable aperture allows for capturing a narrow depth-of-field or a wide depth-of-field in the images. Moreover, larger the aperture size of the given camera, smaller is an F-number used by the given camera for capturing images, and narrower is the depth-of-field captured in the images. Conversely, smaller the aperture size of the given camera, larger is an F-number used by the given camera for capturing images, and wider is the depth-of-field captured in the images. Aperture sizes and their associated F-numbers are well-known in art.

Examples of an F-number of the at least one small aperture size may include, but are not limited to, F/5.6, F/8.0, F/11.0, F/16.0, and F/22.0, F/32.0. Examples of an F-number of the at least one large aperture size may include, but are not limited to, F/1.0, F/1.2, F/1.4, and F/2.0. Furthermore, the "medium aperture size" is an aperture size that lies between the at least one small aperture size and the at least one large aperture size. The at least one medium aperture size to be used could be selected, based on an F-number of the at least one small aperture size and an F-number of the at least one large aperture size being used. Examples of an F-number of the at least one medium aperture size may include, but are not limited to, F/2.8 and F/4.0. It will be appreciated that there could also be other small aperture sizes, other large aperture sizes, and other medium aperture sizes than that mentioned hereinabove.

Optionally, the aperture of the left camera and the right camera is apodized. In this regard, the aperture of a given camera is apodized only when the at least one small aperture size or the at least one medium aperture size is employed. Moreover, the aperture of the given camera is non-apodized (namely, binary), when the at least one large aperture size is employed. A binary aperture could, for example, be a conventional circular aperture.

It will be appreciated that for the given camera to be used for providing different aperture sizes, an aperture of the given camera is to be changed between the different aperture sizes (for example, from an apodized aperture to a binary aperture, and vice versa). Optionally, in this regard, the aperture of the given camera is changed by physically switching between the different aperture sizes. Alternatively, optionally, the aperture of the given camera is electrically controllable. One such way of electrically controlling the aperture of the given camera is described, for example, in a patent document US20070139792A1, titled "ADJUSTABLE APODIZED LENS APERTURE" and filed on Dec. 18, 2006, which has been incorporated herein by reference.

When an aperture of the given camera is apodized, transmission of light through the aperture is gradual along a radius of said aperture in a manner that transmission of light at a centre of said aperture is maximum and transmission of light at an edge of said aperture is zero. Such transmission of light through the aperture follows, for example, a Gaussian distribution curve. The technical benefit of using the apodised aperture is that the aperture of the given camera can be reduced so as to increase depth-of-field without sacrificing sharpness in captured images. Moreover, diffraction-limited modulation transfer function (MTF) of a lens of the given camera with an F/5.6 equivalent apodized aperture is significantly higher as compared to a lens with a F/5.6 circular conventional aperture. This is even higher as compared to a lens with a F/2.8 circular conventional aperture for spatial frequencies below half the Nyquist frequency (N/2). Furthermore, for an F/2.8 equivalent apodized aperture, an MTF may approach 95 percent at N/2, which is substantially improved as compared to 75 percent MTF at N/2 for the lens with F/2.8 circular conventional aperture.

Pursuant to the present disclosure, when capturing a given pair of a left image and a right image using the left camera and the right camera, respectively, an aperture size employed by the left camera is different from an aperture size employed by the right camera. For each cycle of the two consecutive pairs of the left images and the right images, for example, a first left image (namely, a left image of a first pair) and a second right image (namely, a right image of a second pair) are captured by using one of the at least one small aperture size and the at least one large aperture size. It will be appreciated that if the first left image and the second right image are captured using the at least one small aperture size, it is not necessary that both the aforesaid images are captured using a same small aperture size. Likewise, if the first left image and the second right image are captured using the at least one large aperture size, it is not necessary that both the aforesaid images are captured using a same large aperture size. Thus, different small aperture sizes or different large aperture sizes could also be used for capturing the aforesaid images.

Furthermore, according to the aforesaid option (i), when both the first left image and the second right image are captured using the at least one small aperture size, a first right image (namely, a right image of the first pair) and a second left image (namely, a left image of a second pair) are captured using the at least one large aperture size. On the other hand, according to the option (i), when both the first left image and the second right image are captured using the at least one large aperture size, the first right image and the second left image are captured using the at least one small aperture size. In an example, the first left image and the first right image (of the first pair) could be captured using F-numbers F/5.6 and F/1.4, respectively, whereas the second left image and the second right image (of the second pair) could be captured using F-numbers F/1.4 and F/8.0, respectively.

Alternatively, according to the aforesaid option (ii), when the at least one large aperture size is used in alternation for capturing the first left image and the second right image, the at least one small aperture size and the at least one medium aperture size are used for capturing the first right image and the second left image. On the other hand, according to the aforesaid option (ii), when the at least one large aperture size is used in alternation for capturing the first right image and the second left image, the at least one small aperture size and the at least one medium aperture size are used for capturing the first left image and the second right image. It will be appreciated that it is not necessary to use a same medium aperture size for capturing images in each cycle of two consecutive pairs of the left images and the right images. Thus, different medium aperture sizes could also be used for the aforesaid image capturing. In an example, the first left image and the first right image could be captured using F-numbers F/1.4 and F/5.6, respectively, whereas the second left image and the second right image could be captured using F-numbers F/2.8 and F/1.2, respectively.

It will be appreciated that using the at least one large aperture size in alternation according to the aforesaid option (ii) provides an overall better image quality (such as in terms of a high brightness, a high contrast, a high MTF resolution, a low noise, and the like, in low-light conditions). In such a case, using the at least one small aperture size provides an improved depth-of-field across a wide range of focusing distance ranges, while using the at least one medium aperture size provides a smooth transition between the at least one small aperture size and the at least one large aperture size. Notably, human binocular vision fuses the left image and the right image of the given pair into one, such that human brain picks up a better contrasted image from amongst the left image and the right image. In this way, the user would still experience acceptably high realism and immersiveness upon viewing the combined view of the given pair, because of the human binocular vision.

Yet alternatively, according to the aforesaid option (iii), when the at least one small aperture size is used in alternation for capturing the first left image and the second right image, the at least one large aperture size and the at least one medium aperture size are used for capturing the first right image and the second left image. On the other hand, according to the aforesaid option (iii), when the at least one small aperture size is used in alternation for capturing the first right image and the second left image, the at least one large aperture size and the at least one medium aperture size are used for capturing the first left image and the second right image. In an example, the first left image and the first right image could be captured using F-numbers F/8.0 and F/2.0, respectively, whereas the second left image and the second right image could be captured using F-numbers F/2.8 and F/11, respectively.

Moreover, optionally, the imaging apparatus further comprises depth-mapping means. Optionally, the at least one processor is configured to determine whether to use the at least one large aperture size or the at least one small aperture size for capturing the left image of the one of the two consecutive pairs and the right image of the another of the two consecutive pairs, based on a focusing distance range that corresponds to optical depths at which objects are present in a central region in the scene of the real-world environment being captured, the optical depths being determined by the depth-mapping means. In this regard, when the objects (or their portions) present in the central region are nearby objects, i.e., when the objects are considerably closer to a given camera that is employed for capturing images of the scene of the real-world environment, it can be determined that the at least one small aperture size is to be used for capturing said images. This is because even a smaller aperture size (namely, a small-sized opening through which the light travels into the given camera) would be acceptable for providing sufficient light into the given camera for accurately capturing the images of a given object that is closer to the given camera. Moreover, when the objects (or their portions) present in the central region are far objects, i.e., when the objects are considerably distant from the given camera that is employed for capturing images of the scene of the real-world environment, it can be determined that the at least one large aperture size is to be used for capturing said images. This is because a larger aperture size (namely, a large-sized opening through which the light travels into the given camera) would be required for providing sufficient light into the given camera for accurately capturing the images of a given object that is far from the given camera. It will be appreciated that the at least one processor could use the at least one medium aperture size when the objects (or their portions) present in the central region are intermediate objects, i.e., when the objects are present neither too near to the given camera, nor too far from the given camera.

Optionally, when an optical depth of a given object lies in a range of 20 centimetres to 100 centimetres, the given object is considered to be a nearby object. As an example, the optical depth of the given object may be from 20, 25, 50 or 65 centimetres up to 40, 60, 90 or 100 centimetres. Moreover, optionally, when the optical depth of the given object is greater than 100 centimetres, the given object is considered to be a far object. In such a case, the optical depth of the given object lies in a range between 100 centimetres and infinity. As an example, the optical depth of the given object may be 100 centimetres, 110 centimetres, 120 centimetres, 150 centimetres, and so on. Furthermore, optionally, when the optical depth of the given object lies in a range of 80 centimetres to 120 centimetres, the given object is considered to be an intermediate object. As an example, the optical depth of the given object may be from 80, 85, 95 or 110 centimetres up to 90, 100 or 120 centimetres. It will be appreciated that since the optical depths of the objects are already and accurately known from the depth-mapping means, the at least one processor can easily determine whether to categorise the given object as a nearby object, a far object, or an intermediate object, and then to select an aperture size accordingly.

According to one embodiment, the depth-mapping means comprises a specialized equipment that is employed to detect the optical depths of the objects (or their portions) present in the scene of the real-world environment. Optionally, the depth-mapping means is implemented as the left camera and the right camera. In this regard, the left camera and the right camera are implemented as the visible-light camera or as the combination of the visible-light camera and the depth camera. Alternatively, optionally, the depth-mapping means is implemented as at least one depth camera.

According to an alternative or additional embodiment, the depth-mapping means is implemented as the at least one processor, wherein the at least one processor is configured to utilise a three-dimensional (3D) environment model of the real-world environment to generate a depth map of the scene of the real-world environment from different perspectives of a given camera (namely, from different camera poses). The "three-dimensional environment model" is a data structure that comprises comprehensive information pertaining to a 3D space of the real-world environment. The 3D environment model may be in a form of a 3D polygonal mesh, a 3D point cloud, a 3D surface cloud, a 3D surflet cloud, a 3D grid, or similar.

The term "depth map" refers to a data structure comprising information pertaining to the optical depths of the objects (or their portions) present in the real-world environment. Optionally, the at least one processor is configured to generate the depth map by processing depth-mapping data that is collected by the depth-mapping means. In this regard, at least one data processing algorithm may be used to process the depth-mapping data for generating the depth map. The depth-mapping data may be in a form of depth images, phase images, visible-light images, or similar.

Correspondingly, requisite data processing algorithm(s) is/are employed to process the depth-mapping data.

It will be appreciated that the depth map could also be generated using at least one of: depth from stereo, depth from focus, depth from reflectance, depth from shading, when the given camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the depth map could also be generated even without using the depth camera. In this regard, the depth map could be generated by using at least one of: a neural network model, a monocular depth estimation technique, a monochrome image.

Upon capturing the sequence of the pairs of the left images and the right images, the at least one processor sends said sequence to the at least one client device or to the at least one server. In one case, when the at least one processor sends said sequence to the at least one server, the at least one server could then process the images of said sequence, and send the processed images to the at least one client device. Such processing could, for example, include applying an extended depth-of-field correction (EDOF) correction, superimposing at least one virtual object, and the like, on said images. In another case, the at least one processor sends said sequence to the at least one client device for display thereat. The images of said sequence are shown to the user of the at least one client device, via the at least one light source.

Throughout the present disclosure, the term "light source" refers to an element from which light emanates. Optionally, a given light source is implemented as a display. In this regard, a given image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector.

Optionally, in the client device, the processor is configured to:

fuse an $N^{th}$ left image and an $N+1^{th}$ left image into a fused left image, and fuse an $N^{th}$ right image and an $N+1^{th}$ right image into a fused right image; and display the fused left image and the fused right image, instead of the $N^{th}$ left image and the $N^{th}$ right image.

In this regard, when the N+1th left image and the N+1th right image are available to the processor in advance, in addition to the $N^{th}$ left image and the $N^{th}$ right image, the processor performs the aforesaid fusion and displays the fused left image and the fused right image. Herein, the $N^{th}$ image is a given image that was intended to be displayed at a given time instant, whereas $N+1^{th}$ image is an image that is intended to be displayed subsequent to the $N^{th}$ image. Such consecutive images (i.e., $N^{th}$ image and $N+1^{th}$ image) could, for example, be stored in a framebuffer associated with the client device.

It will be appreciated that displaying the fused left image and the fused right image at the client device could be particularly beneficial when camera poses have not changed significantly. The aforementioned fused images are considerably more accurate, realistic, and up-to-date as compared to the $N^{th}$ left image and the $N^{th}$ right image (that were originally intended for displaying at a given time instant), and therefore could be preferred over the $N^{th}$ left image and the $N^{th}$ right image. Such a fusion would also be beneficial for compensating noise penalty of aperture sizes. In other words, a fusion of the $N^{th}$ left image and the $N+1^{th}$ left image is beneficial because it provides an overall better image quality, by combining better contrasted image portions from the $N^{th}$ left image and the $N+1^{th}$ left image that have been captured using different aperture sizes.

It will also be appreciated that the aforementioned fusion of images could be a full-stacked image fusion (in which a pixel of a fused image is generated by combining corresponding pixels of an $N^{th}$ image and an $N+1^{th}$ image), or could be blending of a selected region only (for example, a gaze region in the $N+1^{th}$ image).

Moreover, prior to display of a given image at the client device, the processor may reproject the given image, based on a current head pose of the user of the client device, and optionally, on a gaze direction of the user. Image reprojection and its techniques are well-known in the art.

Furthermore, optionally, the at least one client device comprises a plurality of client devices, and wherein the at least one processor is configured to send a same sequence of the pairs of the left images and the right images to the plurality of client devices or to the at least one server serving the plurality of client devices. In this regard, the imaging apparatus could be employed to simultaneously serve (i.e., could be utilised for simultaneously generating pairs of left images and right images for) a plurality of users associated with the plurality of client devices. This allows for the plurality of users to view high-quality, highly immersive and realistic images in a simultaneous manner. Moreover, this also facilitates in saving processing time and processing resources of the at least one processor as a same sequence of images is being used to serve multiple different client devices. It will be appreciated that the plurality of client devices could be physically present in different real-world environments. For example, the plurality of client devices could be present in different geographical regions (for example, different countries or jurisdictions).

Optionally, the at least one processor is configured to:
receive, from the at least one client device or the at least one server, information indicative of a gaze direction of a user of the at least one client device;
determine a gaze region in the scene of the real-world environment being captured, based on the gaze direction of the user;
select the at least one large aperture size for capturing the left image of the one of the two consecutive pairs and the right image of the another of the two consecutive pairs; and
adjust an optical focus of at least one of: (i) the left camera for capturing the left image of the one of the two consecutive pairs, (ii) the right camera for capturing the right image of the another of the two consecutive pairs, based on a focusing distance range that corresponds to optical depths at which objects are present in the gaze region in the scene of the real-world environment, the optical depths being determined by the depth-mapping means.

Optionally, the at least one client device comprise gaze-tracking means. The term "gaze-tracking means" refers to a specialized equipment for detecting and/or following gaze of the user. The term "gaze direction" refers to a direction in which the user is gazing. The gaze direction may be indicated by a gaze vector. The gaze-tracking means could be implemented as contact lenses with sensors, cameras monitoring a position, a size and/or a shape of a pupil of the user's eyes, and the like. Such gaze-tracking means are well-known in the art. It will be appreciated that the information indicative of the gaze direction of the user is received repeatedly, as user's gaze keeps changing. It will be appreciated that when the at least one processor receives said information from the at least one server, the at least one server first receives said information from the at least one client device, and then sends said information to the at least one processor.

Herein, the term "gaze region" refers to a gaze-contingent area in the scene of the real-world environment whereat the user's gaze is directed (namely, focused). The gaze region may depend on accuracy of the gaze-tracking means as well as a size of a natural human gaze region for an optical depth at which the user is gazing. It will be appreciated that when the user's gaze is directed (namely, focused) towards a point or a region within the scene of the real-world environment, a gaze direction of a first eye and a gaze direction of a second eye of the user are different from each other, and both the aforesaid gaze directions will converge at said point or at said region. Since the gaze direction of the user in the scene of the real-world environment is known, the gaze region could be easily and accurately determined in the scene of the real-world environment by mapping the gaze direction to the scene.

It will be appreciated that when the user would look at an object lying at a given optical depth in the gaze region, there would not be any considerable change in the given optical depth as the user would be viewing a very limited depth-of-field in the gaze region. In such a case, using the at least one small aperture size (which is generally used for providing a wide depth-of-field in a given image) is not required, and thus the at least one large aperture size can be used for capturing the given image. Advantageously, using the at least one large aperture size would provide acceptably uniform brightness and contrast in the given image. As a result, the user would experience immersiveness and realism upon viewing said given image.

Moreover, since the optical depths of the objects are already and accurately known from the depth-mapping means, an optical focus of a given camera can be easily and accurately adjusted by the at least one processor. It will be appreciated that even when only one of: the optical focus of the left camera, the optical focus of the right camera would be adjusted as described above, the two consecutive pairs are still captured with an acceptably high image quality. Furthermore, as the pairs of the left images and the right images are consecutive, and a frame rate of displaying such images is considerably high, the user would not perceive any difference upon viewing said pairs, even when only one of: the optical focus of the left camera, the optical focus of the right camera would be adjusted.

Optionally, the at least one client device comprises a plurality of client devices, and wherein at least one of: the at least one small aperture size, the at least one medium aperture size, the at least one large aperture size comprises a plurality of aperture sizes, further wherein the at least one processor is configured to:
receive, from the plurality of client devices or the at least one server serving the plurality of client devices, information indicative of gaze directions of users of the plurality of client devices;
determine different regions of interest in the scene of the real-world environment being captured, based on the gaze directions of the users; and
select at least one of: a small aperture size from amongst a plurality of small aperture sizes, a medium aperture size from amongst a plurality of medium aperture sizes, a large aperture size from amongst a plurality of large aperture sizes, for capturing a given pair of a left image and a right image, based on a focusing distance range that corresponds to optical depths at which objects are present in the different regions of interest in the scene of the real-world environment, the optical depths being determined by the depth-mapping means.

In this regard, each client device from amongst the plurality of client devices comprises gaze-tracking means. The information indicative of the gaze directions of the users of the plurality of client devices is received in a same manner as described earlier for a single user of the at least one client device. It will be appreciated that different users may have different gaze directions, and thus the different users would focus on the different regions of interest in the scene of the real-world environment. Since the gaze direction of a given user is known, a region of interest corresponding to the given user could be easily and accurately determined in the scene by mapping the gaze direction to the scene.

The term "region of interest" refers to a region in the scene of the real-world environment whereat the given user is focusing or is more likely to focus. In other words, the region of interest is a fixation region within the scene. The region of interest could have visual representation that is more noticeable and prominent as compared to visual representation in other region(s) in the scene of the real-world environment. It will be appreciated that the user is more likely to focus on a region in the scene that represents, for example, a salient feature (namely, a visually alluring feature) or a moving object.

It will be appreciated that when the region of interest corresponding to the given user includes a nearby object (or its portion), the small aperture size from amongst the plurality of small aperture sizes is to be selected (and used) for capturing a given image corresponding to the given user. Moreover, when the region of interest corresponding to the given user includes a far object (or its portion), the large aperture size from amongst the plurality of large aperture sizes is to be selected (and used) for capturing a given image corresponding to the given user. Furthermore, when the region of interest corresponding to the given user would include an intermediate object (or its portion), the medium aperture size from amongst the plurality of medium aperture sizes is to be selected (and used) for capturing a given image corresponding to the given user. Reasons of selecting such different aperture sizes depending on the optical depths of the objects have been already described earlier. It will also be appreciated that since the optical depths of the objects are already and accurately known from the depth-mapping means, the at least one processor can easily determine whether the given object is a nearby object, a far object, or an intermediate object, and then select an aperture size accordingly. In this manner, the imaging apparatus could be beneficially employed to simultaneously serve the (multiple) users associated with the plurality of client devices.

Optionally, the at least one small aperture size comprises a plurality of small aperture sizes, the at least one large aperture sizes comprises a plurality of large aperture sizes, and the at least one medium aperture size optionally comprises a plurality of medium aperture sizes, wherein the at least one processor is configured to select different small aperture sizes, different large aperture sizes and optionally, different medium aperture sizes for capturing the sequence of the pairs of the left images and the right images, to facilitate a smooth transition in aperture sizes across the sequence of the pairs of the left images and the right images. In this regard, the at least one processor selects the aperture sizes for capturing said sequence in a manner that the aperture sizes vary gradually (i.e., there would not be any abrupt change in aperture size when two consecutive images in said sequence are being captured). Thus, when the sequence of the pairs of the left images and the right images is presented to a user of the at least one client device, the user would experience immersiveness and realism upon viewing said sequence. This is because said sequence would be free from any perceivable flicker or a noticeable pattern as a smooth transition in aperture sizes is facilitated across the sequence of the pairs of the left images and the right images. In an example, the different small aperture sizes for capturing said sequence could be selected in an order: F/5.6, F/8.0, F/11.0, F/16.0, F/11.0, F/8.0, F/5.6. In such a case, the different small aperture sizes may first increase one after another, then start to decrease one after another, and then again start to increase one after another, and so on.

Optionally, the at least one processor is configured to:
receive, from the at least one client device or the at least one server, information indicative of a gaze direction of a user of the at least one client device;
determine an optical depth at which the user is gazing, based on the gaze direction of the user and a depth map generated by the depth-mapping means; and
apply an extended depth-of-field correction to at least one of: a left image, a right image of a given pair, based on the optical depth at which the user is gazing.

It will be appreciated that the information indicative of the gaze direction of the user is received from the at least one client device or the at least one server in a same manner as described earlier. Once the gaze direction of the user, and the depth map (comprising information pertaining to optical depths of objects or their portions present in the scene of the real-world environment) are known, the at least one processor can easily determine the optical depth at which the user is gazing by mapping the gaze direction of the user onto the depth map. Alternatively, optionally, the at least one processor is configured to determine the optical depth at which the user is gazing, based on a convergence of gaze directions of the user's eyes. In this regard, the optical depth can be determined, based on an IPD of the user, by using a triangulation technique.

Throughout the present disclosure, the term "extended depth-of-field correction" refers to a corrective image processing operation that emulates a visual effect of extension of the depth-of-field over which objects or their parts in the real-world environment appear to be in-focus (i.e., well focused) in a given image. Herein, the term "depth-of-field" refers to a distance between a nearest point and a farthest point in the real-world environment that are acceptably sharply focused in the given image captured by a given camera. The term "given image" encompasses the left image and/or the right image. A nearest point lies in front of a focus point (for example, such as an object) on which a lens of the given camera is actually focused, while the farthest point lies behind the focus point. The nearest point and the farthest point may be at an equal distance or at an unequal distance from the focus point. The depth-of-field may be determined by a focal length of the lens of the given camera, a distance to the object, an aperture, or similar. The extension of the depth-of-field does not sacrifice resolution or brightness, thereby clearly capturing the objects or portions in the real-world environment without a need to adjust the focus of the given camera and an angle between the objects and the given camera. The EDOF correction enables deblurring of the objects or their portions that lie outside of a focal region of the lens of the given camera (i.e., outside the depth-of-field of the lens of the given camera) to produce an extended-in-focus view of the real-world environment. The EDOF correction may be applied to generate in-focus images of at least one of: multiple objects present in at least a foreground and/or a background of a given object in the real-world environment, oblique objects, objects at different heights, objects at different depths.

Optionally, the EDOF correction is applied by utilising at least one of: defocus map estimation, blind image deblurring deconvolution, non-blind image deblurring deconvolution. These techniques are well-known in the art. The EDOF correction may be performed by employing deblurring neural networks implemented using deep learning techniques, to correct (i.e., deblur) the given image, outside a focal region of a lens of the given camera. Such deblurring neural networks using the deep learning techniques are described, for example, in "*EDoF-ToF: extended depth of field time-of-flight imaging*" by Jasper Tan, Vivek Boominathan et al., published in Optics Express, Vol. 29, Issue 23, pp. 38540-38556, November 2021, in "*Defocus deblurring using dual-pixel data*" by Abdullah Abuolaim et al., published in European Conference on Computer Vision, 2020, and in "*Iterative filter adaptive network for single image defocus deblurring*" by Junyong Lee et al., published in IEEE Conference on Computer Vision and Pattern Recognition, pp. 2034-2042, 2021, which have been incorporated herein by reference.

Optionally, the EDOF correction is applied by employing a Wiener filter based on a predetermined point spread function (PSF) for given camera. It will be appreciated that when the given camera is a fixed-focus camera, focusing distance ranges for small, medium and large aperture sizes and their respective depth-of-fields are pre-known to the at least one processor. In such a case, the EDOF correction could be easily applied when the user is gazing at an optical depth that lies outside the focusing distance range of the given camera. Moreover, different PSFs would be used corresponding to different aperture sizes.

For the given pair of the left image and the right image, the EDOF correction could be applied to any one of the left image and the right image, or to both the left image and the right image. The technical benefit of applying the EDOF correction to any one of the left image and the right image is that it facilitates in saving processing resources and processing time of the at least one processor, as the EDOF correction would not be applied to both the left image and the right image. Even when the EDOF correction is applied selectively in the aforesaid manner, a high visual quality is achieved in a combined view of the given pair. Notably, human binocular vision fuses the left image and the right image of the given pair into one, such that human brain picks up a better contrasted image from amongst the left image and the right image. In this way, the user would still experience acceptably high realism and immersiveness upon viewing the combined view of the given pair, because of the human binocular vision. This may also allow the at least one processor to serve multiple users simultaneously. It will be appreciated that the aforesaid EDOF correction could also be applied by the at least one server, instead of the at least one processor.

Optionally, the at least one processor is configured to:
determine a gaze region in the at least one of: the left image, the right image, based on the gaze direction of the user; and
apply the extended depth-of-field correction to only the gaze region of the at least one of: the left image, the right image.

In this regard, since the gaze direction of the user in the scene of the real-world environment is known, the gaze region could be easily and accurately determined in the at least one of: the left image, the right image (in a same manner as described earlier). It will be appreciated that it is beneficial to deblur the gaze region of the at least one of: the left image, the right image, as compared to other (remaining) region(s) of the at least one of: the left image, the right image. This is because the user's gaze is focused at the gaze region (representing gaze-contingent objects), which is therefore perceived by the user with a high visual acuity, as compared to the other (remaining) region(s). Thus, the at least one processor applies the EDOF correction selectively to the gaze region of the at least one of: the left image, the right image. Beneficially, upon the aforesaid EDOF correction, the user experiences high gaze-contingency and considerable realism upon viewing the at least one of: the left image, the right image. In this manner, processing resources and processing time of the at least one processor could be further reduced as the EDOF correction is applied only to the gaze region of the at least one of: the left image, the right image. The EDOF correction need not be applied to remaining region(s) lying outside the gaze region.

Moreover, optionally, the at least one processor is configured to adjust an exposure time for capturing a given image, wherein a first exposure time for capturing one of a left image and a right image of a given pair using the at least one small aperture size is longer than a second exposure time for capturing another of the left image and the right image using the at least one medium aperture size or the at least one large aperture size. In this regard, in order to achieve a similar visual quality (for example, such as in terms of brightness, contrast, noise, and the like) in both the left image and the right image, the first exposure time is longer than the second exposure time. This is particularly beneficial when image capturing is to be performed in low-light conditions. When the at least one small aperture size is used by a given camera for capturing the one of the left image and the right image, the size of the opening through which the light travels into the given camera is smaller as compared to when the at least one medium aperture size or the at least one large aperture size is used for capturing the another of the left image and the right image. As a result, the left image and the right image would have significantly different visual qualities (for example, different brightness levels, noise levels in both the aforesaid images). Thus, in order to compensate for a difference between the at least one small aperture size and one of: the at least one medium aperture size, the at least one large aperture size, and for achieving similar visual quality in both the aforesaid images, the first exposure time is kept longer than the second exposure time. In this manner, when the (captured) left image and the (captured) right image are fused into one by human binocular vision, binocular rivalry is considerably reduced, and thus the user experiences realism upon viewing a combined view of such images. Herein, the term "exposure time" refers to a time span for which an image sensor of a given camera is exposed to light when capturing a given image.

Optionally, the at least one processor is configured to select a ratio of the first exposure time and the second exposure time to be employed, based on a ratio of an F-number of the at least one small aperture size and an F-number of the at least one medium aperture size or the at least one large aperture size. In this regard, the ratio of the first exposure time and the second exposure time can be ascertained by the at least one processor using the ratio of the aforesaid F-numbers. Such a manner of selecting and adjusting the first exposure time and the second exposure time is easy, reliable, and convenient to implement. In an example, the left image of the given pair may be captured using the at least one small aperture size (having an F-number F/8.0) and the first exposure time, and the right image of the given pair may be captured using the at least one large aperture size (having an F-number F/2.0) and the second exposure time. In such a case, a ratio of the first exposure time and the second exposure time is 4, which means that an exposure time for capturing the left image is four times an exposure time for capturing the right image. In such a case, as an example, the first exposure time and the second exposure time may be 20 milliseconds and 5 milliseconds.

The present disclosure also relates to the method as described above. Various embodiments and variants disclosed above, with respect to the first system, apply mutatis mutandis to the method.

Optionally, the at least one client device comprises a plurality of client devices, wherein the method further comprises sending a same sequence of the pairs of the left images and the right images to the plurality of client devices or to the at least one server serving the plurality of client devices.

Optionally, the method further comprises determining whether to use the at least one large aperture size or the at least one small aperture size for capturing the left image of the one of the two consecutive pairs and the right image of the another of the two consecutive pairs, based on a focusing distance range that corresponds to optical depths at which objects are present in a central region in the scene of the real-world environment being captured, the optical depths being determined by depth-mapping means.

Optionally, the method further comprises:
receiving, from the at least one client device or the at least one server, information indicative of a gaze direction of a user of the at least one client device;
determining a gaze region in the scene of the real-world environment being captured, based on the gaze direction of the user;
selecting the at least one large aperture size for capturing the left image of the one of the two consecutive pairs and the right image of the another of the two consecutive pairs; and
adjusting an optical focus of at least one of: (i) the left camera for capturing the left image of the one of the two consecutive pairs, (ii) the right camera for capturing the right image of the another of the two consecutive pairs, based on a focusing distance range that corresponds to optical depths at which objects are present in the gaze region in the scene of the real-world environment, the optical depths being determined by depth-mapping means.

Optionally, the at least one client device comprises a plurality of client devices, and at least one of: the at least one small aperture size, the at least one medium aperture size, the at least one large aperture size comprises a plurality of aperture sizes, wherein the method further comprises:
receiving, from the plurality of client devices or the at least one server serving the plurality of client devices, information indicative of gaze directions of users of the plurality of client devices;
determining different regions of interest in the scene of the real-world environment being captured, based on the gaze directions of the users; and
selecting at least one of: a small aperture size from amongst a plurality of small aperture sizes, a medium aperture size from amongst a plurality of medium aperture sizes, a large aperture size from amongst a plurality of large aperture sizes, for capturing a given pair of a left image and a right image, based on a focusing distance range that corresponds to optical depths at which objects are present in the different regions of interest in the scene of the real-world environment, the optical depths being determined by depth-mapping means.

Optionally, the at least one small aperture size comprises a plurality of small aperture sizes, the at least one large aperture size comprises a plurality of large aperture sizes, and the at least one medium aperture size optionally comprises a plurality of medium aperture sizes, wherein the method further comprises selecting different small aperture sizes, different large aperture sizes and optionally, different medium aperture sizes for capturing the sequence of the pairs of the left images and the right images, for facilitating a smooth transition in aperture sizes across the sequence of the pairs of the left images and the right images.

Optionally, the method further comprises:
receiving, from the at least one client device or the at least one server, information indicative of a gaze direction of a user of the at least one client device;
determining an optical depth at which the user is gazing, based on the gaze direction of the user and a depth map generated by depth-mapping means; and
applying an extended depth-of-field correction to at least one of: a left image, a right image of a given pair, based on the optical depth at which the user is gazing.

Optionally, the method further comprises:
determining a gaze region in the at least one of: the left image, the right image, based on the gaze direction of the user; and
applying the extended depth-of-field correction to only the gaze region of the at least one of: the left image, the right image.

Optionally, the method further comprises adjusting an exposure time for capturing a given image, wherein a first exposure time for capturing one of a left image and a right image of a given pair using the at least one small aperture size is longer than a second exposure time for capturing another of the left image and the right image using the at least one medium aperture size or the at least one large aperture size.

Optionally, the method further comprises selecting a ratio of the first exposure time and the second exposure time to be employed, based on a ratio of an F-number of the at least one small aperture size and an F-number of the at least one medium aperture size or the at least one large aperture size.

Detailed Description of the Drawings

Figure 1B:
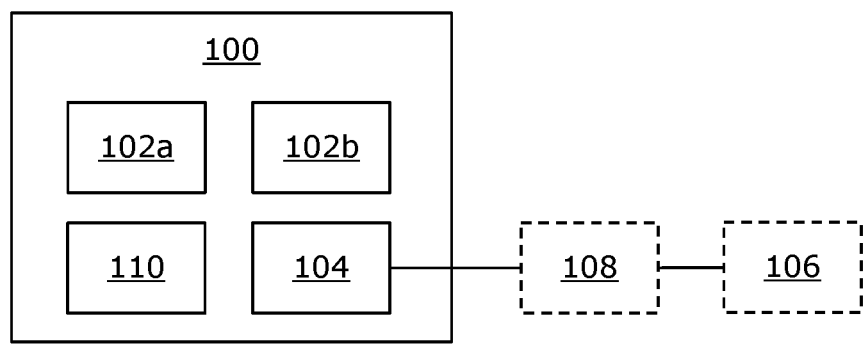

Referring to FIGS. 1A and 1B, illustrated are block diagrams of architectures of an imaging apparatus 100 for capturing images by utilising different apertures for different eyes, in accordance with different embodiments of the present disclosure. With reference to FIGS. 1A and 1B, the imaging apparatus 100 comprises a left camera 102a, a right camera 102b, and at least one processor (depicted as a processor 104). The processor 104 is communicably coupled to at least one client device (depicted as a client device 106). With reference to FIG. 1B, the processor 104 is communicably coupled to at least one server (depicted as a server 108) serving the at client device 106. Moreover, optionally, the imaging apparatus 100 further comprises depth-mapping means 110.

It may be understood by a person skilled in the art that the FIGS. 1A and 1B include simplified architectures of the imaging apparatus 100 for sake of clarity, which should not unduly limit the scope of the claims herein. It is to be understood that the specific implementations of the imaging apparatus 100 are provided as examples and are not to be construed as limiting it to specific numbers or types of cameras, processors, client devices, servers, and depth-mapping means. The person skilled in the art will recognize many variations, alternatives, and modifications of embodiments of the present disclosure.

Referring to FIGS. 2A, 2B, and 2C, illustrated are different exemplary ways in which consecutive pairs of left images and right images are captured, in accordance with an embodiment of the present disclosure. In FIGS. 2A-2C, "S" refers to an image that is captured by utilising at least one small aperture size of a given camera, "M" refers to an image that is captured by utilising at least one medium aperture size of a given camera, and "L" refers to an image that is captured by utilising at least one large aperture size of a given camera. The at least one small aperture size could, for example, be F/5.6, F/8.0, F/11.0, F/16.0, F/22.0, F/32.0, or similar. The at least one medium aperture size could, for example, be F/2.8, F/4.0, or similar. The at least one large aperture size could, for example, be F/1.0, F/1.2, F/1.4, F/2.0, or similar.

FIG. 2A depicts the aforesaid option (i), wherein the images are captured by using the at least one large aperture size "L" and the at least one small aperture size "S" in alternation.

FIG. 2B depicts the aforesaid option (ii), wherein in each cycle of two consecutive pairs, a first left image and a second right image are captured using the at least one large aperture size "L", for example, and a first right image and a second left image are captured using the at least one small aperture size and the at least one medium aperture size, respectively.

FIG. 2C depicts the aforesaid option (iii), wherein in each cycle of two consecutive pairs, a first right image and a second left image are captured using the at least one small aperture size "S", for example, and a first left image and a second right image are captured using the at least one large aperture size and the at least one medium aperture size, respectively.

With reference to FIGS. 2A-2C, there are shown three different sequences in which two consecutive pairs of left images and right images are marked with dotted lines. Although it has been shown for the sake of simplicity that the same pattern repeats for each cycle of two consecutive pairs, it is not necessary. Optionally, a same sequence of the pairs of the left images and the right images could be displayed at a plurality of client devices of a plurality of users.

Figure 3:
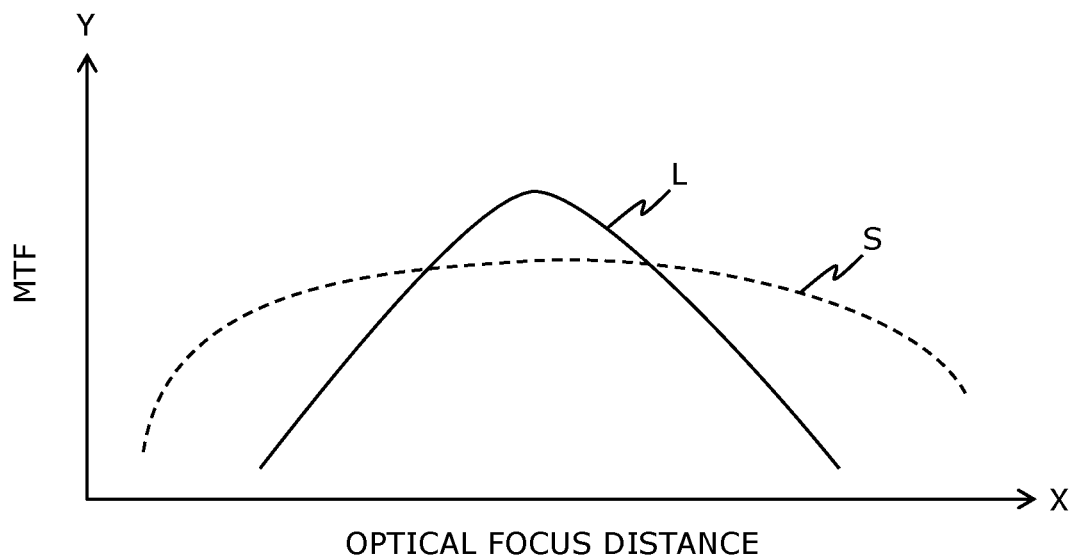
FIG. 3 illustrates an exemplary graphical representation of a variation of a modulation transfer function (MTF) resolution of an image captured using different apertures as a function of an optical focus distance, in accordance with an embodiment of the present disclosure.

Referring to FIG. 3, illustrated is an exemplary graphical representation of a variation of a modulation transfer function (MTF) resolution of an image captured using different apertures as a function of an optical focus distance, in accordance with an embodiment of the present disclosure. Herein, the variation of an MTF resolution of the image captured using a small aperture is shown using a dashed-line curve 'S', and the variation of an MTF resolution of the image captured using a large aperture is shown using a solid-line curve 'L'. As shown, using the small aperture facilitates in capturing an improved depth-of-field for a wide focusing distance range (for example, from 50 centimetres to infinity) with a lower peak-MTF resolution (such as due to diffraction-related issues). On the other hand, using the large aperture facilitates in capturing a limited depth-of-field for a limited focusing distance range (for example, from 70 centimetres to 1.1 metres) with a higher peak-MTF resolution. Therefore, a combination of the small aperture size and the large aperture size is beneficial to be used.

FIGS. 2A-2C and 3 are merely examples, which should not unduly limit the scope of the claims herein. The person skilled in the art will recognize many variations, alternatives, and modifications of embodiments of the present disclosure.

Figure 4:
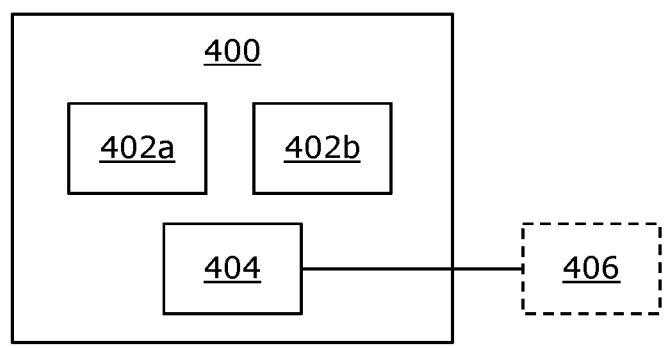
FIG. 4 illustrates a block diagram of architecture of a client device for displaying images captured by utilising different apertures for different eyes, in accordance with an embodiment of the present disclosure.

Referring to, FIG. 4 illustrated is a block diagram of architecture of a client device 400 for displaying images captured by utilising different apertures for different eyes, in accordance with an embodiment of the present disclosure. The client device 400 comprises at least one light source per eye (depicted as a light source 402a for a left eye of a user and a light source 402b for a right eye of the user), and a processor 404. The processor 404 is communicably coupled to an imaging apparatus 406, or to at least one server (not shown) that is communicably coupled to the imaging apparatus 406.

It may be understood by a person skilled in the art that the FIG. 4 includes a simplified architecture of the client device 400 for sake of clarity, which should not unduly limit the scope of the claims herein. It is to be understood that the specific implementations of the client device 400 are provided as examples and are not to be construed as limiting it to specific numbers or types of light sources and processors. The person skilled in the art will recognize many variations, alternatives, and modifications of embodiments of the present disclosure.

Figure 5:
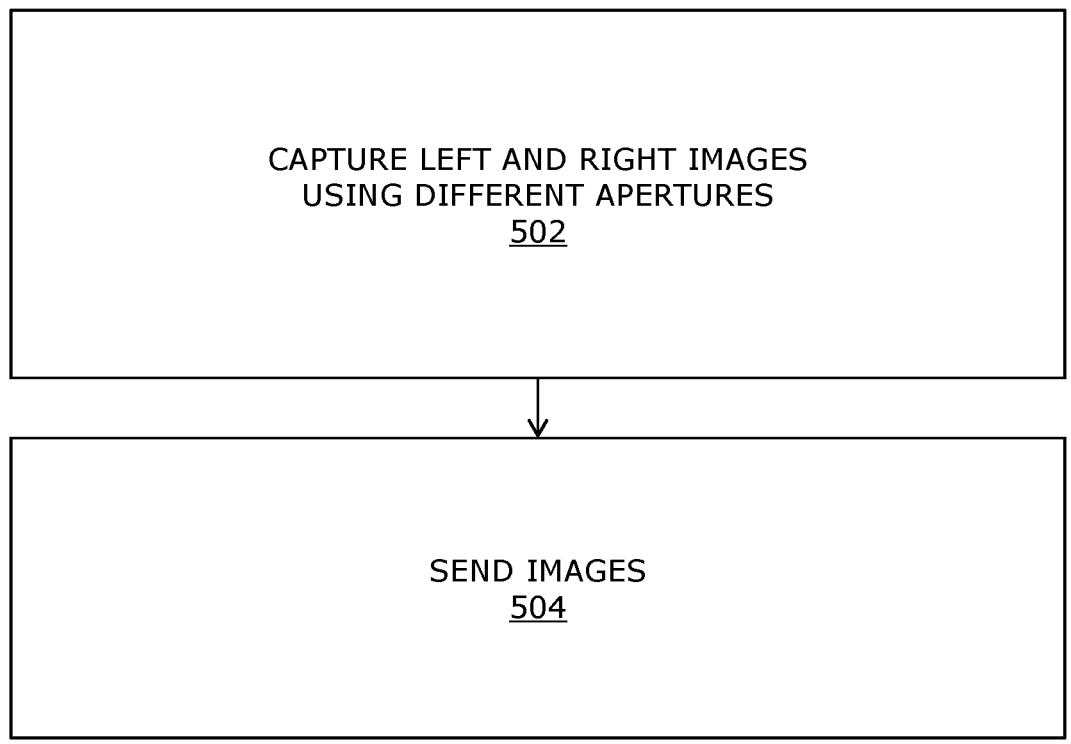
FIG. 5 illustrates steps of a method for capturing images by utilising different apertures for different eyes, in accordance with an embodiment of the present disclosure.

FIG. 5 illustrates steps of a method for capturing images by utilising different apertures for different eyes, in accordance with an embodiment of the present disclosure. At step 502, a sequence of pairs of left images and right images of a scene of a real-world environment is captured by using a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of: (i) another of the at least one small aperture size and the at least one large aperture size, (ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size, (iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size. At step 504, the sequence of the pairs of the left images and the right images is sent to at least one client device or to at least one server serving the at least one client device.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging apparatus comprising:
   a left camera and a right camera, each of the left camera and the right camera having an adjustable aperture; and
   at least one processor communicably coupled to at least one client device or to at least one server serving the at least one client device, wherein the at least one processor is configured to:
   control the left camera and the right camera to capture a sequence of pairs of left images and right images of a scene of a real-world environment, respectively, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
   (i) another of the at least one small aperture size and the at least one large aperture size,
   (ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
   (iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size; and
   send the sequence of the pairs of the left images and the right images to the at least one client device or to the at least one server,
   the imaging apparatus further comprising depth-mapping means, wherein the at least one processor is configured to:
   receive, from the at least one client device or the at least one server, information indicative of a gaze direction of a user of the at least one client device;
   determine a gaze region in the scene of the real-world environment being captured, based on the gaze direction of the user;
   select the at least one large aperture size for capturing the left image of the one of the two consecutive pairs and the right image of the another of the two consecutive pairs; and
   adjust an optical focus of at least one of: (i) the left camera for capturing the left image of the one of the two consecutive pairs, (ii) the right camera for capturing the right image of the another of the two consecutive pairs, based on a focusing distance range that corresponds to optical depths at which objects are present in the gaze region in the scene of the real-world environment, the optical depths being determined by the depth-mapping means.

2. The imaging apparatus of claim 1, wherein the at least one client device comprises a plurality of client devices, and wherein the at least one processor is configured to send a same sequence of the pairs of the left images and the right images to the plurality of client devices or to the at least one server serving the plurality of client devices.

3. The imaging apparatus of claim 1, wherein the at least one processor is configured to determine whether to use the at least one large aperture size or the at least one small aperture size for capturing the left image of the one of the two consecutive pairs and the right image of the another of the two consecutive pairs, based on the focusing distance range that corresponds to optical depths at which objects are present in a central region in the scene of the real-world environment being captured, the optical depths being determined by the depth-mapping means.

4. The imaging apparatus of claim 1, wherein the at least one small aperture size comprises a plurality of small aperture sizes, the at least one large aperture size comprises a plurality of large aperture sizes, and the at least one medium aperture size optionally comprises a plurality of medium aperture sizes, wherein the at least one processor is configured to select different small aperture sizes, different large aperture sizes and optionally, different medium aperture sizes for capturing the sequence of the pairs of the left images and the right images, to facilitate a smooth transition in aperture sizes across the sequence of the pairs of the left images and the right images.

5. The imaging apparatus of claim 1, wherein the at least one processor is configured to:
   determine an optical depth at which the user is gazing, based on the gaze direction of the user and a depth map generated by the depth-mapping means; and
   apply an extended depth-of-field correction to at least one of: a left image, a right image of a given pair, based on the optical depth at which the user is gazing.

6. The imaging apparatus of claim 5, wherein the at least one processor is configured to:
   determine the gaze region in the at least one of: the left image, the right image, based on the gaze direction of the user; and
   apply the extended depth-of-field correction to only the gaze region of the at least one of: the left image, the right image.

7. The imaging apparatus of claim 1, wherein the at least one processor is configured to adjust an exposure time for capturing a given image, wherein a first exposure time for capturing one of a left image and a right image of a given pair using the at least one small aperture size is longer than a second exposure time for capturing another of the left image and the right image using the at least one medium aperture size or the at least one large aperture size.

8. The imaging apparatus of claim 7, wherein the at least one processor is configured to select a ratio of the first exposure time and the second exposure time to be employed, based on a ratio of an F-number of the at least one small aperture size and an F-number of the at least one medium aperture size or the at least one large aperture size.

9. The imaging apparatus of claim 1, wherein the aperture of the left camera and the right camera is apodized.

10. An imaging apparatus comprising:
    a left camera and a right camera, each of the left camera and the right camera having an adjustable aperture; and at least one processor communicably coupled to at least one client device or to at least one server serving the at least one client device, wherein the at least one processor is configured to:
control the left camera and the right camera to capture a sequence of pairs of left images and right images of a scene of a real-world environment, respectively, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
(i) another of the at least one small aperture size and the at least one large aperture size,
(ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
(iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size;
send the sequence of the pairs of the left images and the right images to the at least one client device or to the at least one server;
the imaging apparatus further comprising depth-mapping means, wherein the at least one client device comprises a plurality of client devices, and wherein at least one of: the at least one small aperture size, the at least one medium aperture size, the at least one large aperture size comprises a plurality of aperture sizes, further wherein the at least one processor is configured to:
receive, from the plurality of client devices or the at least one server serving the plurality of client devices, information indicative of gaze directions of users of the plurality of client devices;
determine different regions of interest in the scene of the real-world environment being captured, based on the gaze directions of the users; and
select at least one of: a small aperture size from amongst a plurality of small aperture sizes, a medium aperture size from amongst a plurality of medium aperture sizes, a large aperture size from amongst a plurality of large aperture sizes, for capturing a given pair of a left image and a right image, based on a focusing distance range that corresponds to optical depths at which objects are present in the different regions of interest in the scene of the real-world environment, the optical depths being determined by the depth-mapping means.

11. A method comprising:
capturing a sequence of pairs of left images and right images of a scene of a real-world environment by using a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
(i) another of the at least one small aperture size and the at least one large aperture size,
(ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
(iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size;
sending the sequence of the pairs of the left images and the right images to at least one client device or to at least one server serving the at least one client device;
receiving, from the at least one client device or the at least one server, information indicative of a gaze direction of a user of the at least one client device;
determining a gaze region in the scene of the real-world environment being captured, based on the gaze direction of the user;
selecting the at least one large aperture size for capturing the left image of the one of the two consecutive pairs and the right image of the another of the two consecutive pairs; and
adjusting an optical focus of at least one of: (i) the left camera for capturing the left image of the one of the two consecutive pairs, (ii) the right camera for capturing the right image of the another of the two consecutive pairs, based on a focusing distance range that corresponds to optical depths at which objects are present in the gaze region in the scene of the real-world environment, the optical depths being determined by depth-mapping means.

12. The method of claim 11, wherein the at least one client device comprises a plurality of client devices, and wherein the method further comprises sending a same sequence of the pairs of the left images and the right images to the plurality of client devices or to the at least one server serving the plurality of client devices.

13. The method of claim 11, further comprising determining whether to use the at least one large aperture size or the at least one small aperture size for capturing the left image of the one of the two consecutive pairs and the right image of the another of the two consecutive pairs, based on the focusing distance range that corresponds to optical depths at which objects are present in a central region in the scene of the real-world environment being captured, the optical depths being determined by the depth-mapping means.

14. The method of claim 11, wherein the at least one small aperture size comprises a plurality of small aperture sizes, the at least one large aperture size comprises a plurality of large aperture sizes, and the at least one medium aperture size optionally comprises a plurality of medium aperture sizes, wherein the method further comprises selecting different small aperture sizes, different large aperture sizes and optionally, different medium aperture sizes for capturing the sequence of the pairs of the left images and the right images, for facilitating a smooth transition in aperture sizes across the sequence of the pairs of the left images and the right images.

15. The method of claim 11, further comprising:
determining an optical depth at which the user is gazing, based on the gaze direction of the user and a depth map generated by the depth-mapping means; and
applying an extended depth-of-field correction to at least one of: a left image, a right image of a given pair, based on the optical depth at which the user is gazing.

16. The method of claim 15, further comprising:
determining the gaze region in the at least one of: the left image, the right image, based on the gaze direction of the user; and
applying the extended depth-of-field correction to only the gaze region of the at least one of: the left image, the right image.

17. The method of claim 11, further comprising adjusting an exposure time for capturing a given image, wherein a first exposure time for capturing one of a left image and a right image of a given pair using the at least one small aperture size is longer than a second exposure time for capturing another of the left image and the right image using the at least one medium aperture size or the at least one large aperture size.

18. The method of claim 17, further comprising selecting a ratio of the first exposure time and the second exposure time to be employed, based on a ratio of an F-number of the at least one small aperture size and an F-number of the at least one medium aperture size or the at least one large aperture size.

19. A method comprising:
capturing a sequence of pairs of left images and right images of a scene of a real-world environment by using a left camera and a right camera, respectively, each of the left camera and the right camera having an adjustable aperture, wherein in each cycle of two consecutive pairs of left images and right images, a left image of one of the two consecutive pairs and a right image of another of the two consecutive pairs are captured by using one of at least one small aperture size and at least one large aperture size, whilst a right image of the one of the two consecutive pairs and a left image of the another of the two consecutive pairs are captured by using any one of:
(i) another of the at least one small aperture size and the at least one large aperture size,
(ii) one of the at least one small aperture size and at least one medium aperture size and another of the at least one small aperture size and the at least one medium aperture size, respectively, when the left image of the one of the two consecutive pairs and the right image of the another of the two consecutive pairs are captured by using the at least one large aperture size,
(iii) one of the at least one large aperture size and the at least one medium aperture size and another of the at least one large aperture size and the at least one medium aperture size, respectively, when the left image of the one of the two consecutive pairs and the right image of the another of the two consecutive pairs are captured by using the at least one small aperture size;
sending the sequence of the pairs of the left images and the right images to at least one client device or to at least one server serving the at least one client device, wherein the at least one client device comprises a plurality of client devices, and wherein at least one of: the at least one small aperture size, the at least one medium aperture size, the at least one large aperture size comprises a plurality of aperture sizes, wherein the method further comprises:
receiving, from the plurality of client devices or the at least one server serving the plurality of client devices, information indicative of gaze directions of users of the plurality of client devices;
determining different regions of interest in the scene of the real-world environment being captured, based on the gaze directions of the users; and
selecting at least one of: a small aperture size from amongst a plurality of small aperture sizes, a medium aperture size from amongst a plurality of medium aperture sizes, a large aperture size from amongst a plurality of large aperture sizes, for capturing a given pair of a left image and a right image, based on a focusing distance range that corresponds to optical depths at which objects are present in the different regions of interest in the scene of the real-world environment, the optical depths being determined by depth-mapping means.

* * * * *